US00RE37734E

(19) United States
(12) Reissued Patent
Buehler

(10) Patent Number: US RE37,734 E
(45) Date of Reissued Patent: Jun. 11, 2002

(54) DISPENSING BULB

(75) Inventor: John D. Buehler, Bridgeton, NJ (US)

(73) Assignee: Comar, Inc., Buena, NJ (US)

(21) Appl. No.: 09/542,641

(22) Filed: Apr. 3, 2000

Related U.S. Patent Documents

Reissue of:
(64) Patent No.: 5,775,546
Issued: Jul. 7, 1998
Appl. No.: 08/848,880
Filed: May 1, 1997

(51) Int. Cl.[7] ..... B65D 37/00; B65D 47/18; B01L 3/02

(52) U.S. Cl. ..... 222/209; 222/420; 73/864.11; 73/864.15; 604/217

(58) Field of Search ..... 222/206, 209, 222/215, 420, 478, 481; 141/26, 31; 73/864.11, 864.15, 864.03, 864.14; 604/212, 216, 217; 422/99, 100, 299

(56) References Cited

U.S. PATENT DOCUMENTS 672,207 A * 4/1901 Dunn ..... 604/299
2,399,796 A * 5/1946 Freeman ..... 604/299
2,728,232 A * 12/1955 Bremmer ..... 73/425.6
2,941,869 A * 6/1960 Brown et al. ..... 23/253
3,552,605 A * 1/1971 Hein ..... 222/207

* cited by examiner

*Primary Examiner*—Henry C. Yuen
*Assistant Examiner*—Melvin A. Cartagena
(74) *Attorney, Agent, or Firm*—Eugene E. Renz, Jr.

(57) ABSTRACT

A dispensing bulb having a squeezable body portion and integral squeezable neck portion having a pair of diametrically disposed vent holes. An adaptor is mounted in the neck portion and is provided with a cylindrical portion extending into the bulb neck portion beyond the vent holes and spaced radially inwardly therefrom. A dispensing tube is connected to the adaptor and communicates with the interior of the bulb. The neck portion of the bulb is squeezed to draw liquid into the tube, and the cylindrical portion of the adaptor limits the squeezing of the neck portion to prevent liquid from being drawn through the tube into the body portion of the bulb.

8 Claims, 3 Drawing Sheets

FIG. 1
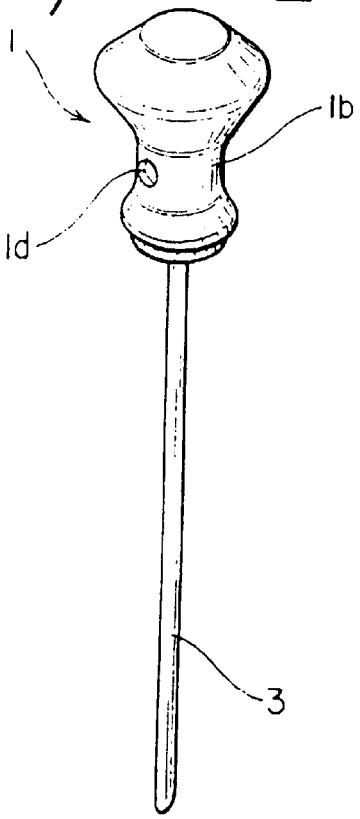
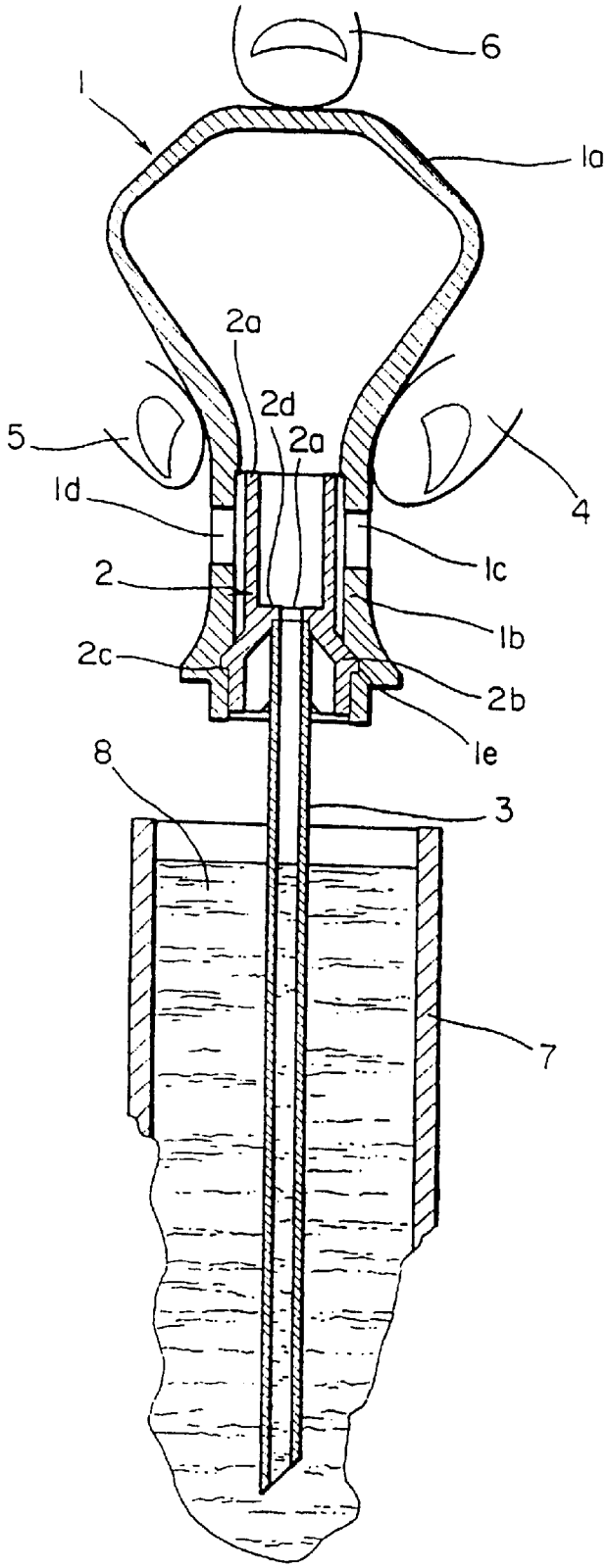
FIG. 2

DISPENSING BULB

Matter enclosed in heavy brackets [ ] appears in the original patent but forms no part of this reissue specification; matter printed in italics indicates the additions made by reissue.

BACKGROUND OF THE INVENTION

Conventional dispensing bulbs have been proposed wherein a squeezable bulb is connected to one end of a tube, whereby fluid can be drawn into the opposite end of the tube by first squeezing the bulb and then allowing it to expand, whereby a vacuum is provided to draw the fluid into the tube. The fluid is dispensed from the tube by once again squeezing the bulb to produce a pressure forcing the fluid out of the dispensing end of the tube. Depending upon how hard the bulb is squeezed will determine how much fluid is drawn into the tube and oftentimes through the tube and into the bulb.

When employing a dispensing bulb for dispensing medicines, it is important that a proper dosage of the medicine be drawn into the tube, and not into the bulb where the medicine could become contaminated.

After considerable research and experimentation, the dispensing bulb of the present invention has been devised for not only dispensing proper medicinal dosages, but also for preventing the medicine from being drawn into the bulb.

SUMMARY OF THE INVENTION

The dispensing bulb of the present invention comprises a squeezable bulb having a neck portion provided with a pair of diametrically disposed vent holes. An adaptor is press-fit into the open end of the bulb neck portion. One end of the adaptor is provided with a cylindrical portion extending into the bulb neck portion beyond the vent holes and spaced radially inwardly therefrom. The opposite end portion of the adaptor holds one end of a dispensing tube, and a partition, having an aperture, is provided in the adaptor, whereby the dispensing tube communicates with the interior of the bulb and the vent holes.

By the construction and arrangement of the bulb dispenser of the present invention, a certain dosage of medication can be permitted to flow into the dispensing tube by capillary action and then dispensed therefrom by squeezing the bulb. If a larger dosage is desired than that provided by the capillary action, the vent holes are covered by the thumb and middle finger of the user, and the neck portion of the bulb is squeezed until it abuts the radially inwardly spaced cylindrical portion of the adaptor. The neck portion of the bulb is then allowed to expand thereby drawing a small dosage of the medicine into the tube. To dispense the medicine from the tube, the vent holes are uncovered allowing the medicine to flow outwardly of the tube. If the amount of medicine drawn into the tube is slightly more than the desired dosage, the vent holes can be partially uncovered to allow a portion of the medicine to drain from the tube.

If the medicine being used is a nasal medication, once the tube is filled with the desired dosage, the open end of the filled tube is inserted into a patient's nose with the vent holes closed. The patient's head is then tilted back, and the bulb is then squeezed to dispense the medication into the patient's nasal passages.

In lieu of filling the tube by capillary action, the open end of the tube can be inserted into the nozzle of a squeezable container containing a supply of the medicine. With the vent holes open, the container is squeezed forcing the medicine from the container into the tube.

BRIEF DESCRIPTION OF THE DRAWINGS

FIG. 1 is a perspective view of the dispensing bulb of the present invention;

FIG. 2 is a sectional side elevational view of the dispensing bulb being used to draw medication into the tube by capillary action;

DESCRIPTION OF THE PREFERRED EMBODIMENTS

Figure 4:
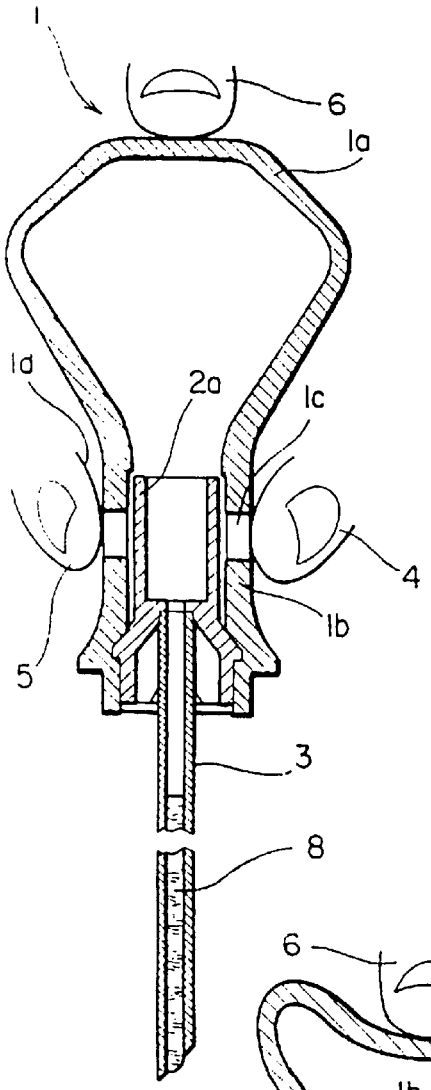
FIG. 4 is a sectional side elevational view of the bulb showing the neck portion thereof being allowed to expand from the position of FIG. 3.

Referring to the drawing and, more particularly to FIGS. 1 and 2, the dispensing bulb 1 of the present invention comprises a squeezable body portion 1a having a squeezable neck portion 1b provided with a pair of diametrically disposed vent holes 1c, 1d.

An adaptor 2 is press-fit into the bulb neck portion 1b and includes, at one end, a cylindrical tubular portion 2a extending beyond the vent holes 1c, 1d and spaced radially inwardly therefrom. The opposite end of the adaptor 1 is provided with an outwardly flared portion 2b terminating in a flange portion 2c receivable within a correspondingly configured annular groove 1e in the bulb neck portion 1b. A transversely extending partition 2d is provided in the adaptor 2 between the tubular portion 2a and the flared portion 2b. One end of a tube 3 is press-fit into the partition 2d which is provided with an aligned aperture 2e, whereby the tube 3 communicates with the body portion 1a of the bulb and the vent holes 1c and 1d.

Figure 5:
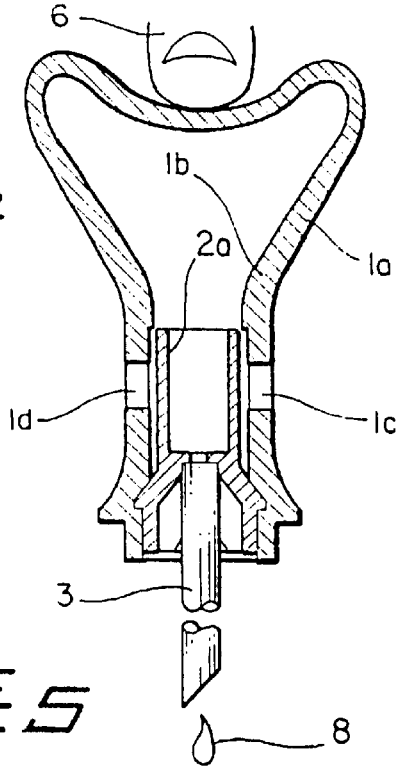
FIG. 5 is a sectional side elevational view of the bulb being squeezed to dispense medication from the tube.

When using the dispensing bulb 1, as shown in FIG. 2, the thumb 4 and middle finger 5 of the user are placed in proximity to the neck portion 1b of the bulb above the vent holes 1c, 1d, and the index finger 6 is placed on top of the bulb. The tube 3 is dipped into a receptacle 7 containing a liquid 8, and the liquid is drawn into the tube 3 by capillary action. The vent holes 1c and 1d are then covered by the thumb 4 and middle finger 5, and the tube 3 containing a volume of the liquid 8 is removed form the receptacle 7, and the liquid can be dispensed from the tube 3 by pressing the index finger 6 downwardly to squeeze the portion 1a, as shown in FIG. 5, to thereby pressurize the tube 3 to dispense the liquid. In lieu of squeezing the bulb portion 1a, the vent holes 1c, 1d can be merely uncovered to drain the liquid from the tube 3.

Figure 3:
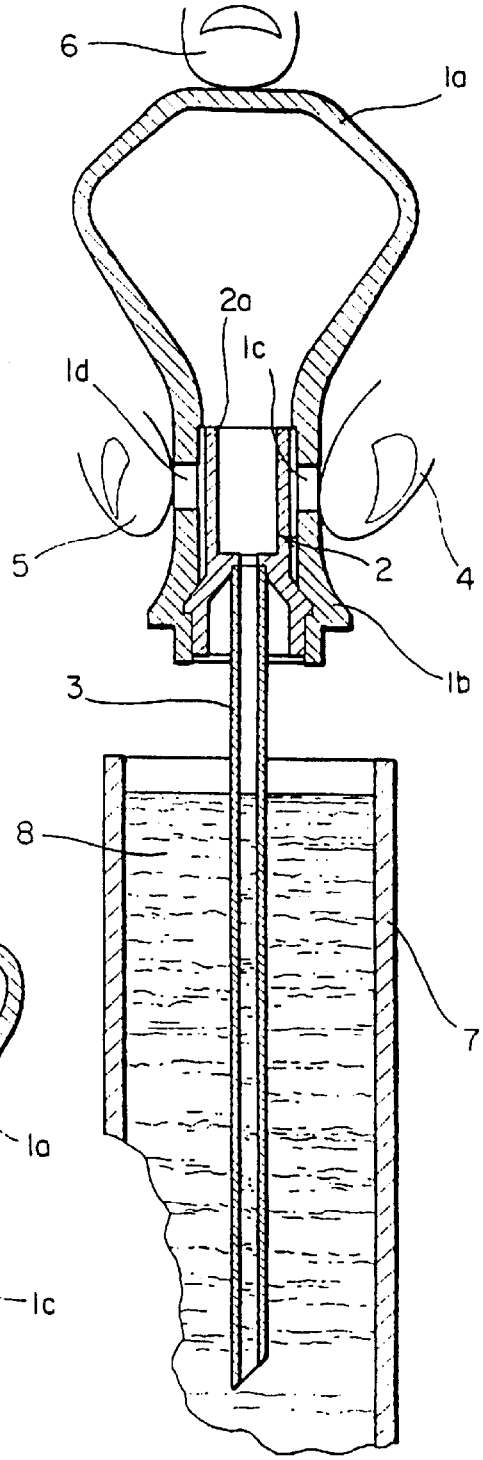
FIG. 3 is a sectional side elevational view of the bulb showing the neck portion thereof being squeezed inwardly.

If it is desired to draw a greater volume of liquid 8 into the tube 3 than is drawn therein by capillary action, the dispensing bulb 1 can be operated, as shown in FIGS. 3 and 4, wherein the vent holes 1c and 1d are covered by the user's thumb 4 and middle finger 5, and the neck portion 1b is squeezed radially inwardly against the cylindrical tubular portion 2a of the adaptor 2. While maintaining the vent holes 1c and 1d covered, the neck portion 1b is allowed to expand radially outwardly, as shown in FIG. 4, whereby a volume of liquid 8 is drawn into the tube 3. The liquid 8 can be dispensed from the tube 3 either by uncovering the vent holes 1c, 1d to allow the liquid to drain from the tube 3, or forcibly dispensed from the tube by squeezing the body portion 1a, as noted above.

Figure 6:
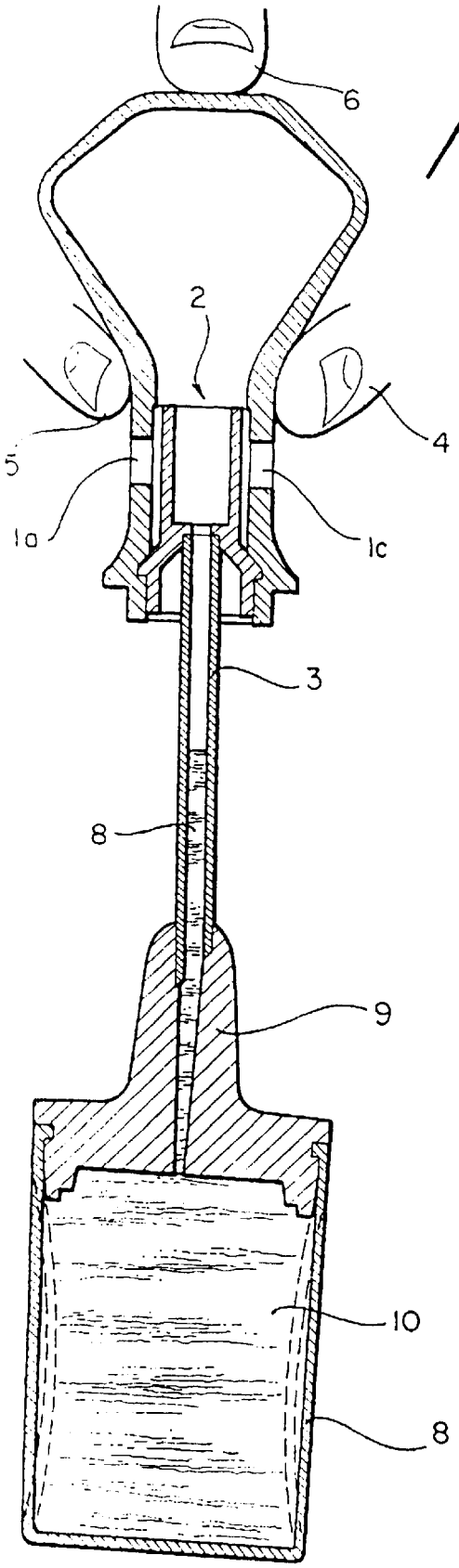
FIG. 6 is a sectional side elevational view of the dispensing bulb of the present invention illustrating the filling of the bulb tube from a container containing a supply of the medication.

FIG. 6 illustrates another method of filling the tube 3 with liquid, wherein the dispensing end of the tube is inserted into a nozzle 9 closing a squeezable receptacle 10 containing a supply of the liquid 8. In this arrangement, the vent holes 1c and 1d are uncovered, and the receptacle 10 is squeezed forcing the liquid into the tube 3. The vent holes 1c and 1d are then covered, and the tube 3 is removed from the nozzle 9, the liquid 8 being dispensed from the tube 3 either by draining or by pressurizing as noted above.

Figure 7:
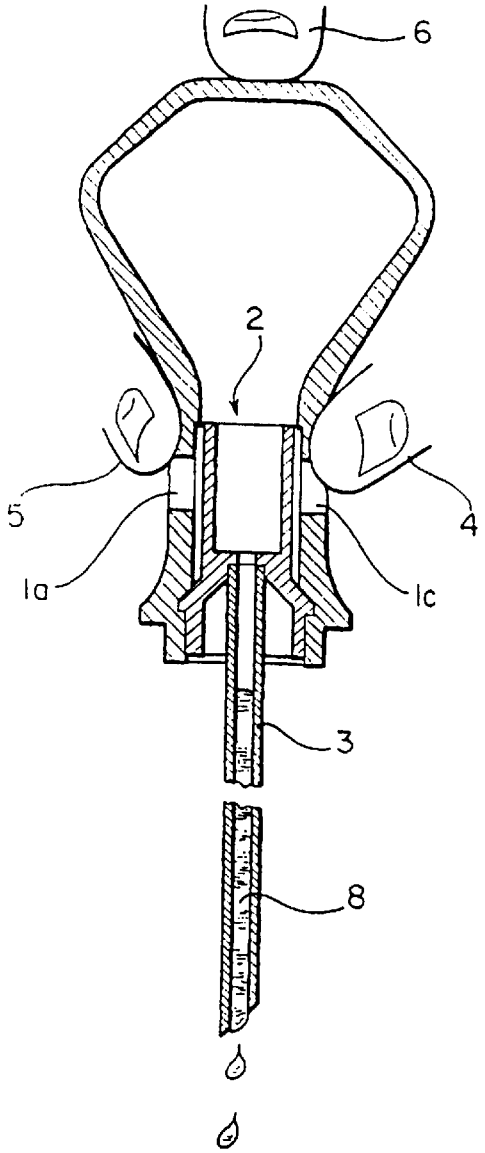
FIG. 7 is a sectional side elevational view of the dispensing bulb showing the vent holes being partially open to allow some of the medication to drain from the tube.

If it is desired to reduce the volume of the liquid 8 in the tube 3 by a few drops, as shown in FIG. 7, thumb 4 and middle finger 5 of the user are manipulated to partially uncover the vent holes 1c and 1d until the proper volume of liquid is obtained whereupon the vents 1c, 1d are once again fully covered by the thumb 4 and middle finger 5.

The dispensing bulb 1 of the present invention has been devised for dispensing medicines; and thus, it is important that the liquid medicine not be drawn into the body portion 1a of the bulb during the filling of the tube 3 which might result in the contamination of the medicine. Squeezing of the neck portion 1b is limited by the cylindrical tubular portion 2a of the adaptor 2, to thereby limit the drawing of the medicine into the tube 2 and not into the body portion 1a of the bulb.

From the above description, it will be appreciated by those skilled in the art that the dispensing bulb of the present invention is constructed and arranged for not only dispensing proper medicinal dosages, but also, for preventing the medicine from being drawn into the bulb.

It is to be understood that the form of the invention herewith shown and described is to be taken as a preferred example of the same, and that various changes in the shape, size, and arrangement of parts may be resorted to, without departing from, the spirit of the invention or scope of the subjoined claims.

I claim:

1. A dispensing bulb comprising a squeezable body portion, a squeezable neck portion integral with said squeezable body portion, at least one vent hole provided in said neck portion, an adaptor mounted in said neck portion, said adaptor having a portion spaced radially inwardly from said neck portion, a tube, one end of said tube being connected to said adaptor, a transversely extending partition mounted in said adaptor, and an aperture extending through said partition, said vent hole being positioned on one side of said partition, said one end of said tube being positioned on the opposite side of said partition, said tube communicating with said neck portion and said vent hole through said aperture, whereby liquid can be selectively drawn into the tube by capillary action and squeezing the neck portion of the bulb radially inwardly against the radially inwardly spaced portion of the adaptor to thereby draw a volume of liquid into the tube, the radially inwardly spaced portion of the adaptor limiting the squeezing of the neck portion to thereby prevent liquid from being drawn through the tube and into the body portion of the bulb.

2. A dispensing bulb according to claim 1, wherein a pair of diametrically opposed vent holes are provided in said neck portion, said vent holes being adapted to be closed by a thumb and index finger of a user, the body portion of the bulb being adapted to be engaged by the middle finger of the user.

3. A dispensing bulb according to claim 1, wherein the radially inwardly spaced portion of the adaptor comprises a cylindrical tubular portion on one end of said adaptor.

4. A dispensing bulb according to claim 3, wherein an outwardly flared portion is provided on the opposite end of said adaptor, a flange on the terminal end of said flared portion, an annular groove provided in said neck portion, said flange being inserted into said groove, whereby the adaptor is press-fit into said neck portion.

*5. An adaptor for a dispensing bulb comprising a squeezable body portion, a squeezable neck portion integral with the squeezable body portion having at least one vent hole in the neck portion, an adaptor mounted in the neck portion having a portion spaced radially inwardly from the neck portion, a tube connected at one end to said adaptor, a transversely extending partition mounted in said adaptor, and an aperture extending through said partition, vent hole being positioned on one side of said partition, said one end of said tube being positioned on the opposite side of said partition, said tube communicating with the neck portion and vent hole through said aperture, whereby liquid can be selectively drawn into the tube by capillary action and squeezing the neck portion of the bulb radially inwardly against the radially inwardly spaced portion of the adaptor to thereby draw a volume of liquid into the tube, the radially inwardly spaced portion of the adaptor limiting the squeezing of the neck portion to thereby prevent liquid from being drawn through the tube and into the body portion of the bulb.*

*6. An adaptor for a dispensing bulb according to claim 5, wherein a pair of diametrically opposed vent holes are provided in the neck portion, the vent holes being adapted to be closed by a thumb and index finger of a user, the body portion of the bulb being adapted to be engaged by the middle finger of the user.*

*7. An adaptor for a dispensing bulb according to claim 5, wherein the radially inwardly spaced portion of the adaptor comprises a cylindrical tubular portion on one end of said adaptor.*

*8. An adaptor for a dispensing bulb according to claim 7, wherein an outwardly flared portion is provided on the opposite end of said adaptor, a flange on the terminal end of said flared portion, an annular groove provided in said neck portion, said flange being inserted into said groove, whereby the adaptor is press-fit into said neck portion.*

* * * * *